United States Patent
Griffin et al.

(10) Patent No.: US 12,450,509 B2
(45) Date of Patent: Oct. 21, 2025

(54) ACCESS PROTECTION FOR SHARED QUBITS

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 481 days.

(21) Appl. No.: 17/184,195

(22) Filed: Feb. 24, 2021

(65) Prior Publication Data

US 2022/0269965 A1  Aug. 25, 2022

(51) Int. Cl.
  *G06N 10/00*  (2022.01)
  *G06F 9/48*  (2006.01)
  *G06F 21/62*  (2013.01)

(52) U.S. Cl.
  CPC .......... *G06N 10/00* (2019.01); *G06F 9/4881* (2013.01); *G06F 21/62* (2013.01)

(58) Field of Classification Search
  CPC ...... G06N 10/00; G06N 10/80; G06F 9/4881; G06F 21/62; G06F 21/78
  See application file for complete search history.

(56) References Cited

U.S. PATENT DOCUMENTS

| | | | |
|---|---|---|---|
| 6,658,650 B1 * | 12/2003 | Bates | G06F 11/362 714/E11.21 |
| 7,496,203 B2 | 2/2009 | Choi et al. | |
| 8,108,625 B1 * | 1/2012 | Coon | G06F 13/1663 711/158 |
| 9,692,595 B2 | 6/2017 | Lowans et al. | |
| 10,389,525 B2 | 8/2019 | Fu et al. | |
| 10,567,169 B2 | 2/2020 | Hong et al. | |
| 11,119,385 B2 * | 9/2021 | Wang | G02F 1/3526 |
| 2005/0289143 A1 * | 12/2005 | Oshri | G06F 12/00 |
| 2006/0206901 A1 * | 9/2006 | Chan | G06F 9/524 718/107 |
| 2009/0271794 A1 * | 10/2009 | Zoll | G06F 9/46 718/103 |

(Continued)

OTHER PUBLICATIONS

Nigg, Simon E., Observing quantum synchronization blockade in circuit quantum electrodynamics, Jan. 2018, American Physical Society, 97, (Year: 2018).*

(Continued)

*Primary Examiner* — Jorge A Chu Joy-Davila
(74) *Attorney, Agent, or Firm* — Dority & Manning, P.A.

(57) ABSTRACT

Access protection for shared qubits is disclosed herein. In one example, a processor device first determines that a first quantum process associated with one or more qubits is scheduled for execution (e.g., based on metadata obtained from the quantum process manager.) The processor device next identifies a second quantum process that is active and that is also associated with the one or more qubits. The processor device then prevents the first quantum process (i.e., the quantum process that is scheduled to execute) from accessing the one or more qubits. In some examples, the processor device may prevent access to the one or more qubits by causing the first quantum process to be placed in a blocked state pending release of the one or more qubits by the second quantum process (i.e., the currently active quantum process).

17 Claims, 6 Drawing Sheets

(56) References Cited

U.S. PATENT DOCUMENTS

| | | | | |
|---|---|---|---|---|
| 2012/0151110 A1* | 6/2012 | Pointon | ............... | G06F 9/526 |
| | | | | 710/200 |
| 2012/0222051 A1* | 8/2012 | Kakulamarri | ......... | G06F 9/544 |
| | | | | 719/328 |
| 2014/0108648 A1* | 4/2014 | Nelke | ............... | G06F 9/5072 |
| | | | | 709/224 |
| 2014/0351825 A1* | 11/2014 | Xu | ..................... | G06F 9/526 |
| | | | | 718/106 |
| 2019/0042971 A1* | 2/2019 | Zou | ..................... | G06F 9/30 |
| 2020/0313879 A1 | 10/2020 | Hong et al. | | |
| 2021/0004707 A1* | 1/2021 | Gambetta | ............. | G06F 15/16 |
| 2023/0023333 A1* | 1/2023 | Naveh | ................. | G06F 3/016 |

OTHER PUBLICATIONS

Broadbent, Anne, et al., "Quantum Cryptography Beyond Quantum Key Distribution," Designs, Codes and Cryptography, vol. 78, 2016, pp. 351-382, available online at https://link.springer.com/article/10.1007/s10623-015-0157-4.

Dušek, Miloslav, et al., "Quantum Identification System," 1998, 9 pages, available online at https://arxiv.org/pdf/quant-ph/9809024.

* cited by examiner

ACCESS PROTECTION FOR SHARED QUBITS

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to manage access to shared qubits that may be associated with more than one quantum process will be desirable.

SUMMARY

The examples disclosed herein implement a quantum blocking mechanism that ensures that a quantum process that is associated with one or more shared qubits and is scheduled for execution is prevented from accessing the qubit(s) until a currently active quantum process that is also associated with the shared qubit(s) releases the shared qubit(s).

In one example, a method for providing access protection for shared qubits is disclosed. The method comprises determining, by a quantum computing device, that a first quantum process associated with one or more qubits is scheduled for execution. The method further comprises identifying a second quantum process that is active and is associated with the one or more qubits. The method also comprises preventing the first quantum process from accessing the one or more qubits.

In another example, a quantum computing device for providing access protection for shared qubits is disclosed. The quantum computing device comprises a system memory and a processor device coupled to the system memory. The processor device is to determine that a first quantum process associated with one or more qubits is scheduled for execution. The processor device is further to identify a second quantum process that is active and is associated with the one or more qubits. The processor device is also to prevent the first quantum process from accessing the one or more qubits.

In another example, a computer program product is provided. The computer program product comprises a non-transitory computer-readable medium having stored thereon computer-executable instructions which, when executed, cause a processor device to determine that a first quantum process associated with one or more qubits is scheduled for execution. The computer-executable instructions further cause the processor device to identify a second quantum process that is active and is associated with the one or more qubits. The computer-executable instructions also cause the processor device to prevent the first quantum process from accessing the one or more qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum process" and "second quantum process," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of non-quantum bits used in classical computing (i.e., conventional non-quantum computing). As quantum computing continues to increase in popularity and become more commonplace, an ability to manage access to shared qubits that may be associated with more than one quantum process will be desirable.

The examples disclosed herein implement a quantum blocking mechanism that ensures that a quantum process that is associated with one or more shared qubits and is scheduled for execution is prevented from accessing the qubit(s) until a currently active quantum process that is also associated with the shared qubit(s) releases the shared qubit(s). The term "quantum process" and derivatives thereof are used herein to refer to a process that executes on a quantum computing device, and that accesses one or more qubits to provide a desired functionality. The term "quantum blocking" and derivates thereof are used herein to refer to operations for preventing access to a qubit that is associated with multiple quantum processes in order to preserve data encoded by the qubit and/or to preserve a given quantum state of the qubit.

To provide access protection for such qubits, a quantum blocking service, executing on a processor device of a quantum computing device, first determines that a first quantum process associated with one or more qubits is scheduled for execution. This determination may be based on, e.g., metadata obtained from a quantum process manager of the quantum computing device. The quantum blocking service next identifies a second quantum process that is active and that is also associated with the one or more qubits. Some examples may provide that the second quantum process is identified by the metadata obtained from the quantum process manager and/or on qubit registry entries of a qubit registry that correspond to the one or more qubits.

The quantum blocking service then prevents the first quantum process (i.e., the quantum process that is scheduled to execute) from accessing the one or more qubits. This may be accomplished in some examples by causing the first quantum process to be placed in a blocked state (e.g., using the quantum process manager) pending release of the one or more qubits by the second quantum process (i.e., the currently active quantum process). According to some examples, the quantum blocking service may also notify the second quantum process that access to the one or more qubits has been requested by the first quantum process. The second quantum process may then take steps to ensure that the first quantum process is allowed to access the one or more qubits in a timely manner.

Some examples may further provide that the quantum blocking service may subsequently determine that the second quantum process has released the one or more qubits. The quantum blocking service then determines, based on the qubit registry, that the one or more qubits are available for access by the first quantum process, and enables access to the one or more qubits by the first quantum process. In some examples, enabling access to the one or more qubits may be accomplished by causing the first quantum process to be placed in an active state (e.g., using the quantum process manager).

Figure 1:
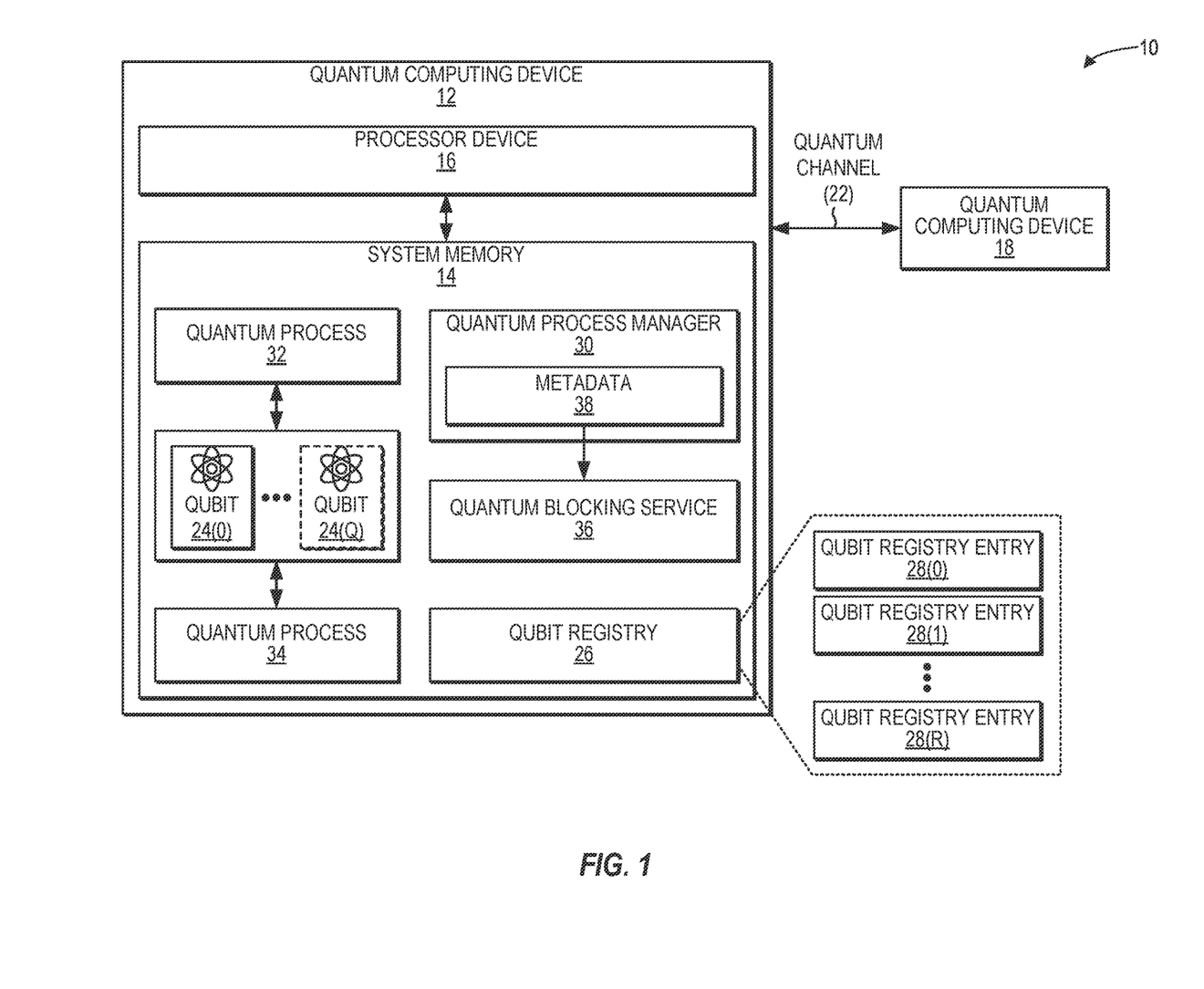
FIG. 1 is a block diagram of a quantum computing system in which examples may be practiced.

FIG. 1 is a block diagram of a quantum computing system 10 according to one example. The quantum computing system 10 includes a quantum computing device 12 that comprises a system memory 14 and a processor device 16, and also includes a quantum computing device 18 that includes constituent elements similar to those of the quantum computing device 12 and provides functionality corresponding to the functionality attributed herein to the quantum computing device 12. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 in the example of FIG. 1 may be close in physical proximity to one another or may be relatively long distances from one another. The quantum computing device 12 and the quantum computing device 18 operate in quantum environments but can operate using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1). The quantum computing device 12 and the quantum computing device 18 may be communicatively coupled via a conventional communications link (not shown) and/or via a quantum channel 22 over which qubits may be transmitted.

In the example of FIG. 1, the quantum computing device 12 implements a set of one or more qubits 24(0)-24(Q). To maintain information for the qubit(s) 24(0)-24(Q), the quantum computing device 12 includes a qubit registry 26, which comprises a plurality of qubit registry entries 28(0)-28(R) each corresponding to a qubit such as the one or more qubits 24(0)-24(Q). The qubit registry 26 in some examples maintains data regarding the qubits implemented by the quantum computing device 12, such as a count of the total number of qubits implemented by the quantum computing device 12 and a count of the number of available qubits that are currently available for allocation, as non-limiting examples. Each of the qubit registry entries 28(0)-28(R) also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum process, an identifier of a quantum process associated with the corresponding qubit, and/or an entanglement indicator that indicates whether the corresponding qubit is in an entangled state.

While the one or more qubits 24(0)-24(Q) are shown in FIG. 1 as all being implemented by the quantum computing device 12, it is to be understood that some examples may provide that the one or more qubits 24(0)-24(Q) may be distributed across multiple quantum computing devices. For instance, in some examples, some of the one or more qubits 24(0)-24(Q) may be implemented by the quantum computing device 12, while others of the one or more qubits 24(0)-24(Q) may be implemented by the quantum computing device 18. However, the principles of the operations disclosed herein for providing access protection for shared qubits remains the same in such examples.

To provide functionality for managing quantum processes, the quantum computing device 12 provides a quantum process manager 30. The quantum process manager 30 is responsible for managing the scheduling of quantum processes, which may include placing quantum processes in an active state to allow each quantum process to execute, or placing quantum processes in a blocked state to suspend execution of each quantum process. The quantum process manager 30 maintains quantum process metadata (not shown) that includes data for each quantum process executing on the quantum computing device 12. The quantum process metadata may include, as non-limiting examples, a unique process identifier for a corresponding quantum process (i.e., a process identifier unique to a specific instance of a quantum process), a process name of the quantum process (i.e., a name for the quantum process that remains the same over multiple instances), an internet protocol (IP) address associated with the quantum process, an identifier of qubits utilized by the quantum process, and/or a name and location of a Quantum Assembly Language (QASM) file that implements the quantum process.

In exemplary operation, at a point in time prior to that illustrated in FIG. 1, the quantum process manager 30 receives a request (not shown), from an operator or from a quantum application, to initiate a quantum process 32 (also referred to herein as a "first quantum process 32"). The quantum process manager 30 causes an allocation of a memory space (not shown) for the quantum process 32, and initiates the quantum process 32 in the memory space via a QASM file (not shown). The quantum process manager 30 generates metadata for the quantum process 32, and may also analyze and parse the QASM file from which the quantum process 32 was initiated to determine the one or more qubits 24(0)-24(Q) that are utilized by the quantum process 32. The quantum process manager 30 may then store the metadata for the quantum process 32, and may also cause qubit metadata in the qubit registry 26 corresponding to the one or more qubits 24(0)-24(Q) to be updated to indicate that the one or more qubits 24(0)-24(Q) are associated with the quantum process 32.

The quantum process manager 30 also follows a similar sequence of operations to initiate a quantum process 34 (also referred to herein as a "second quantum process 34"). The quantum process 34 in the example of FIG. 1 is also associated with the one or more qubits 24(0)-24(Q). It is to be understood that, while the quantum process 32 and the quantum process 34 are shown in FIG. 1 as being initiated by the quantum computing device 12, some examples may provide that the quantum process 32 and the quantum process 34 each may be initiated on different quantum computing devices that are communicatively coupled via a conventional communications link and/or a quantum channel. Thus, the principles of the operations disclosed herein for providing access protection for shared qubits remains the same in such examples.

As part of managing the quantum process 32 and the quantum process 34, the quantum process manager 30 handles the scheduling and current state (e.g., active or blocked, as non-limiting examples) of the quantum process 32 and the quantum process 34. However, it is noted that, while sharing the one or more qubits 24(0)-24(Q) between the quantum process 32 and the quantum process 34 may enable the quantum computing device 12 to achieve a greater level of functionality, the sharing of the qubits 24(0)-24(Q) runs the risk of the quantum process 32 and the quantum process 34 interfering with each other's execution, or even destabilizing the one or more qubits 24(0)-24(Q) in a manner that may not be recoverable.

Accordingly, examples disclosed herein provide mechanisms for access protection of the one or more qubits 24(0)-24(Q). In one example, a quantum blocking service 36 is executed by the processor device 16 of the quantum computing device 12 to control access to the one or more qubits 24(0)-24(Q) shared between the quantum process 32 and the quantum process 34. By controlling access, the quantum blocking service 36 ensures that only one of the quantum process 32 and the quantum process 34 can access the one or more qubits 24(0)-24(Q) at a given time.

In exemplary operation, the quantum blocking service 36 first determines that the quantum process 32, associated with the one or more qubits 24(0)-24(Q), is scheduled for execution. This determination may be based on, e.g., metadata 38 that the quantum blocking service 36 obtains from the quantum process manager 30, and that may include information related to the identity, current state, and scheduled execution time for each of the quantum process 32 and the quantum process 34. The quantum blocking service 36 next identifies the quantum process 34 as a quantum process that is active and that is also associated with the one or more qubits 24(0)-24(Q). The quantum process 34 may be identified based on the metadata 38, and/or on information obtained from one or more of the qubit registry entries 28(0)-28(R) that correspond to the one or more qubits 24(0)-24(Q).

The quantum blocking service 36 then prevents the quantum process 32 (i.e., that is scheduled to execute) from accessing the one or more qubits 24(0)-24(Q). This may be accomplished in some examples by causing the quantum process 32 to be placed in a blocked state (e.g., using the quantum process manager 30) pending release of the one or more qubits 24(0)-24(Q) by the quantum process 34 (i.e., the currently active quantum process). According to some examples, the quantum blocking service 36 may also notify the quantum process 34 that access to the one or more qubits 24(0)-24(Q) has been requested by the quantum process 32. The quantum process 32 may then take steps to ensure that the quantum process 34 is allowed to access the one or more qubits 24(0)-24(Q) in a timely manner.

In some examples, after the quantum process 34 has entered an inactive state and/or is no longer performing operations on the one or more qubits 24(0)-24(Q), the quantum blocking service 36 may determine that the quantum process 34 has released the one or more qubits 24(0)-24(Q) (e.g., based on the one or more of the qubit registry entries 28(0)-28(R) corresponding to the one or more qubits 24(0)-24(Q)). The quantum blocking service 36 then determines, based on the qubit registry 26, that the one or more qubits 24(0)-24(Q) are available for access by the quantum process 32, and enables access to the one or more qubits 24(0)-24(Q) by the quantum process 32. In some examples, enabling access to the one or more qubits 24(0)-24(Q) by the quantum process 32 may be accomplished by causing the quantum process 32 to be placed in an active state (e.g., using the quantum process manager 30).

It is to be understood that, because the quantum blocking service 36 is a component of the quantum computing device 12, functionality implemented by the quantum blocking service 36 may be attributed to the quantum computing system 12 generally. Moreover, in examples where the quantum blocking service 36 comprises software instructions that program the processor device 16 to carry out functionality discussed herein, functionality implemented by the quantum blocking service 36 may be attributed herein to the processor device 16. It is to be further understood that while, for purposes of illustration only, the quantum blocking service 36 is depicted as a single component, the functionality implemented by the quantum blocking service 36 may be implemented in any number of components, and the examples discussed herein are not limited to any particular number of components.

Figure 2A:
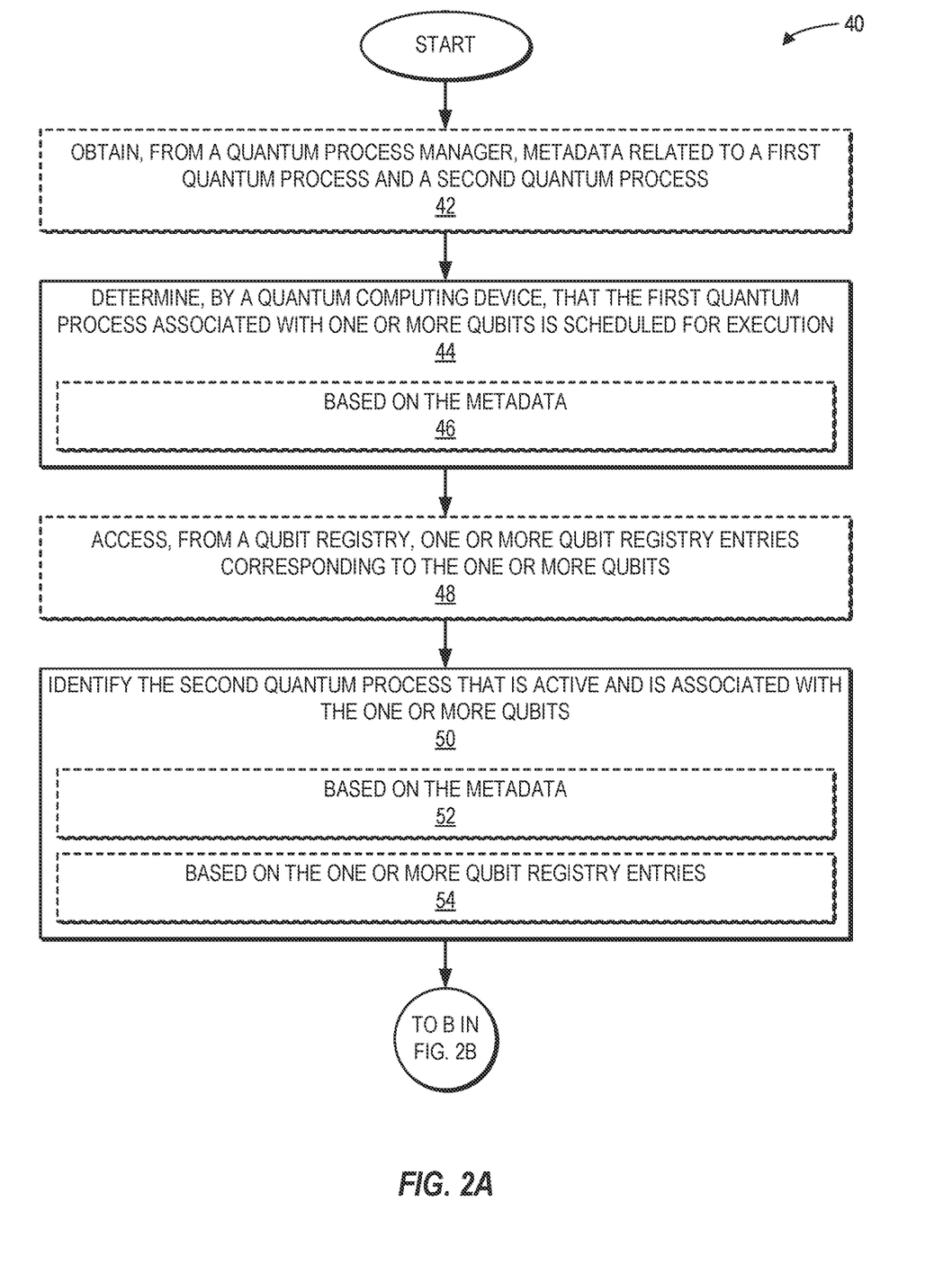
FIGS. 2A and 2B are flowcharts illustrating operations for providing access protection for shared qubits, according to one example.
Figure 2B:
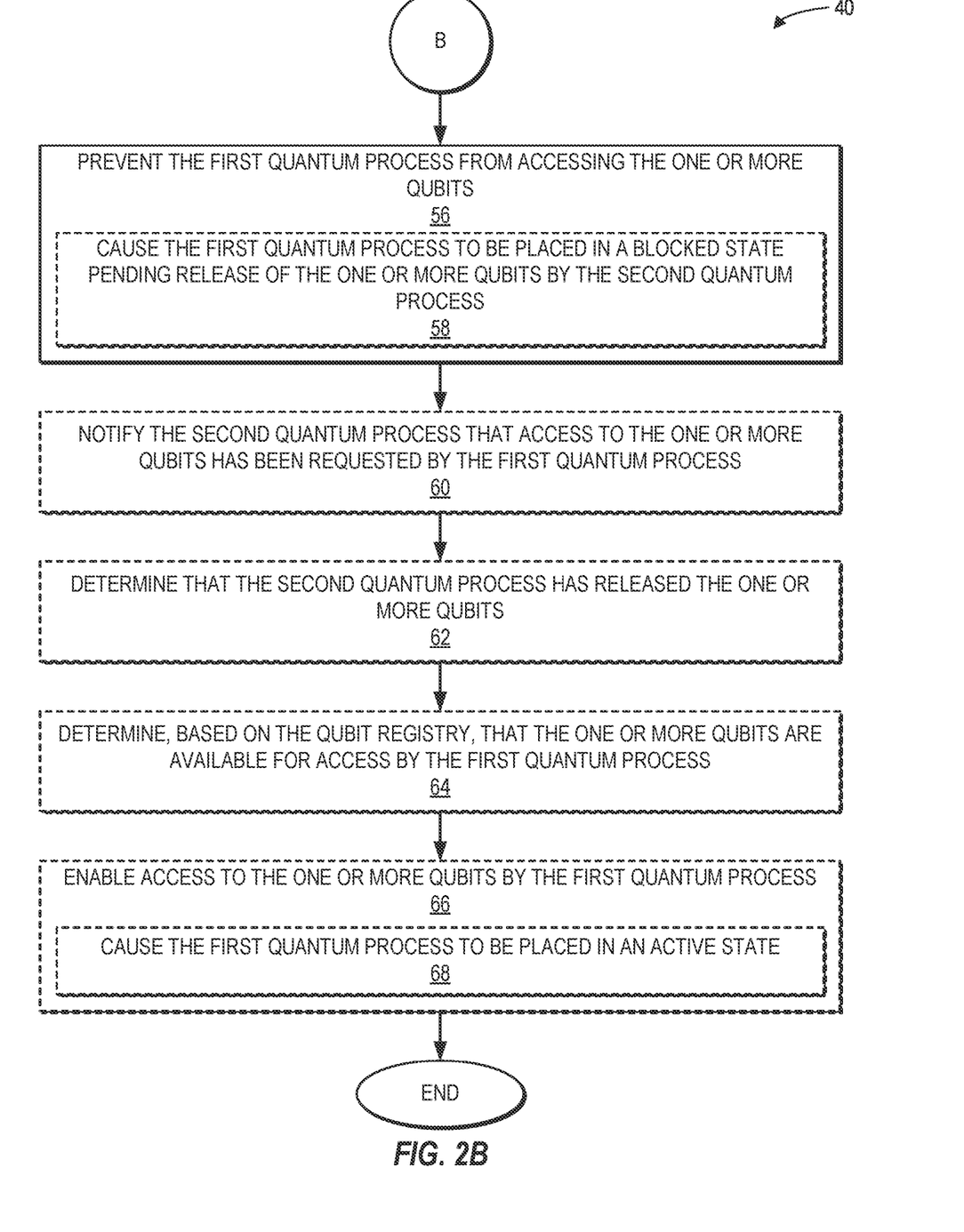

To illustrate exemplary operations of the quantum computing device 12 of FIG. 1 for providing access protection for shared qubits, FIGS. 2A and 2B provide a flowchart 40. Elements of FIG. 1 are referenced in describing FIGS. 2A and 2B for the sake of clarity. In FIG. 2A, operations according to some examples begin with the processor device 16 of the quantum computing device 12 (e.g., by executing the quantum blocking service 36) obtaining, from the quantum process manager 30, the metadata 38 related to the first quantum process 32 and the second quantum process 34 (block 42). The processor device 16 determines that the first quantum process 32 associated with the one or more qubits 24(0)-24(Q) is scheduled for execution (block 44). In some examples, the operations of block 44 for determining that the first quantum process 32 is scheduled for execution are based on the metadata 38 (block 46).

According to some examples, the processor device 16 may access, from the qubit registry 26, one or more qubit registry entries 28(0)-28(R) corresponding to the one or more qubits 24(0)-24(Q) (block 48). The processor device 16 identifies the second quantum process 34 that is active and is associated with the one or more qubits 24(0)-24(Q) (block 50). Some examples may provide that the operations of block 50 for identifying the second quantum process 34 are based on the metadata 38 (block 52). In some examples, the operations of block 50 for identifying the second quantum process 34 are based on the one or more qubit registry entries 28(0)-28(R) (block 54). Operations then continue at block 56 of FIG. 2B.

Referring now to FIG. 2B, the processor device 16 then prevents the first quantum process 32 from accessing the one or more qubits 24(0)-24(Q) (block 56). According to some examples, the operations of block 56 for preventing the first quantum process 32 from accessing the one or more qubits 24(0)-24(Q) may include the processor device 16 causing the first quantum process 32 to be placed in a blocked state pending release of the one or more qubits 24(0)-24(Q) by the second quantum process 34 (block 58). In some examples, the processor device 16 may also notify the second quantum process 34 that access to the one or more qubits 24(0)-24(Q) has been requested by the first quantum process 32 (block 60).

Some examples may provide that the processor device 16 additionally determines that the second quantum process 34 has released the one or more qubits 24(0)-24(Q) (block 62). The processor device 16 determines, based on the qubit registry 26, that the one or more qubits 24(0)-24(Q) are available for access by the first quantum process 32 (block 64). The processor device 16 then enables access to the one or more qubits 24(0)-24(Q) by the first quantum process 32 (block 66). According to some examples, the operations of block 66 for enabling access to the one or more qubits 24(0)-24(Q) may comprise the processor device 16 causing the first quantum process 32 to be placed in an active state (block 68).

Figure 3:
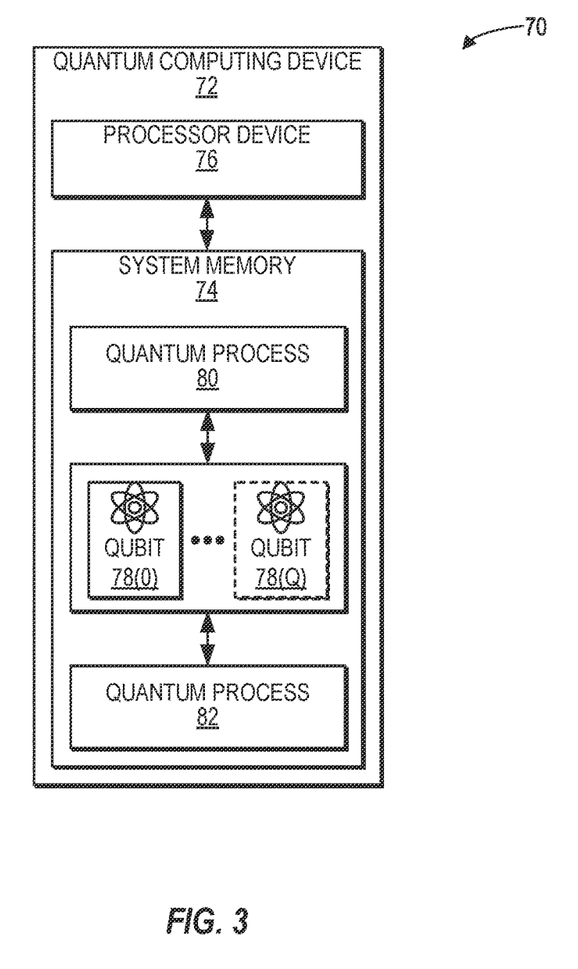
FIG. 3 is a simpler block diagram of the quantum computing device of FIG. 1 for providing access protection for shared qubits, according to one example.

FIG. 3 is a simpler block diagram of the quantum computing system 10 of FIG. 1 for providing access protection for shared qubits, according to one example. In the example of FIG. 3, the quantum computing system 70 includes a quantum computing device 72 that comprises a system memory 74 and a processor device 76. The quantum computing device 72 implements a set of one or more qubits 78(0)-78(Q), and initiates a quantum process 80 (also referred to herein as a "first quantum process 80") and a quantum process 82 (also referred to herein as a "second quantum process 82"). Both the quantum process 80 and the quantum process 82 are associated with the one or more qubits 78(0)-78(Q), such that the one or more qubits 78(0)-78(Q) are shared between the quantum process 80 and the quantum process 82. In exemplary operation, the processor device 76 first determines that the quantum process 80, associated with the one or more qubits 78(0)-78(Q), is scheduled for execution.

The processor device 76 next identifies the quantum process 82 as a quantum process that is active and that is also associated with the one or more qubits 78(0)-78(Q). The processor device 76 then prevents the quantum process 80 (i.e., that is scheduled to execute) from accessing the one or more qubits 78(0)-78(Q).

Figure 4:
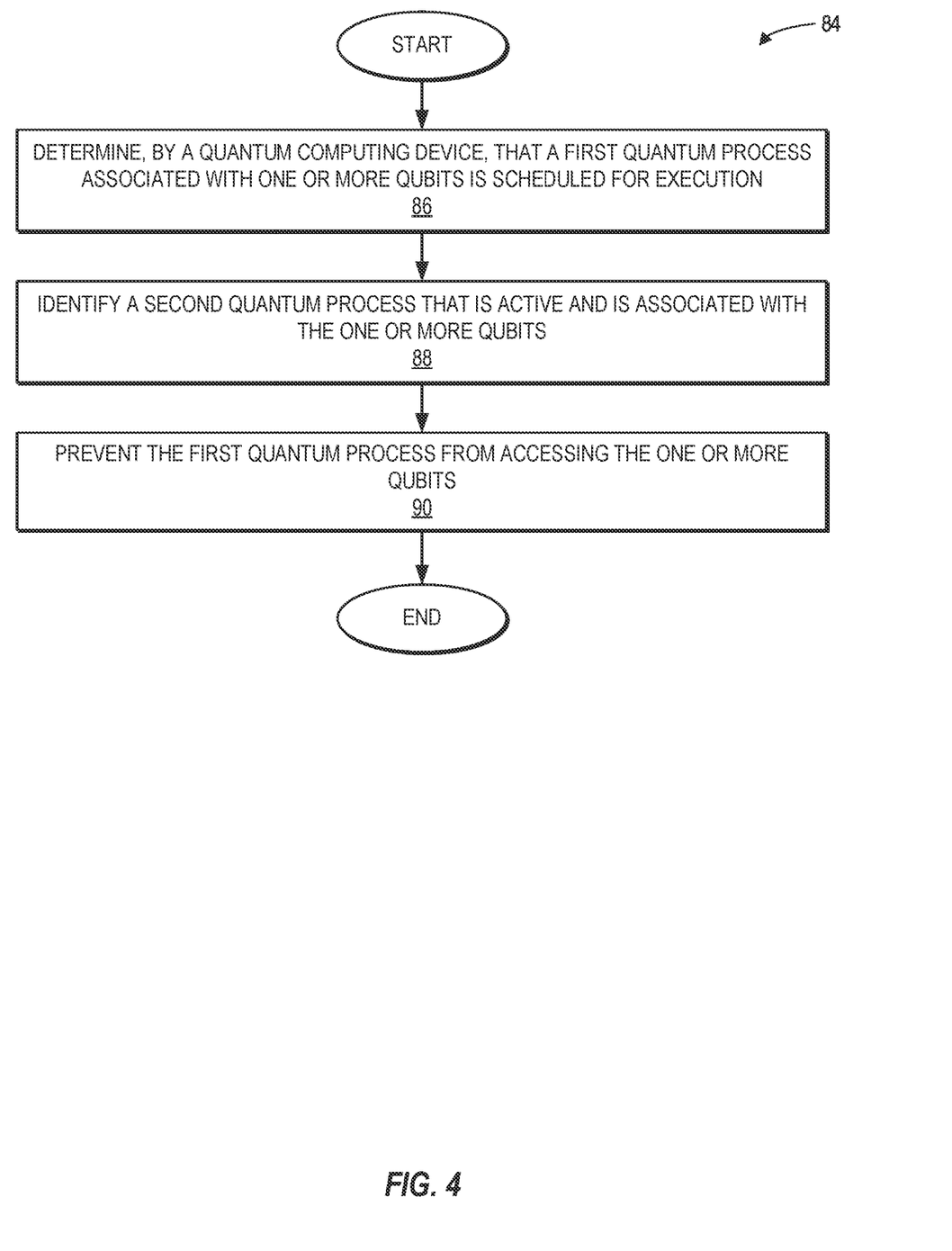
FIG. 4 is a flowchart of a simplified method for providing access protection for shared qubits in the quantum computing device of FIG. 3, according to one example.

FIG. 4 provides a flowchart 84 of a simplified method for providing access protection for shared qubits in the quantum computing system 70 of FIG. 3, according to one example. For the sake of clarity, elements of FIG. 3 are referenced in describing FIG. 4. In FIG. 4, operations begin with the processor device 76 of the quantum computing device 72 determining that the first quantum process 80 associated with the one or more qubits 78(0)-78(Q) is scheduled for execution (block 86). The processor device 76 identifies the second quantum process 82 that is active and is associated with the one or more qubits 78(0)-78(Q) (block 88). The processor device 76 then prevents the first quantum process 80 from accessing the one or more qubits 78(0)-78(Q) (block 90).

Figure 5:
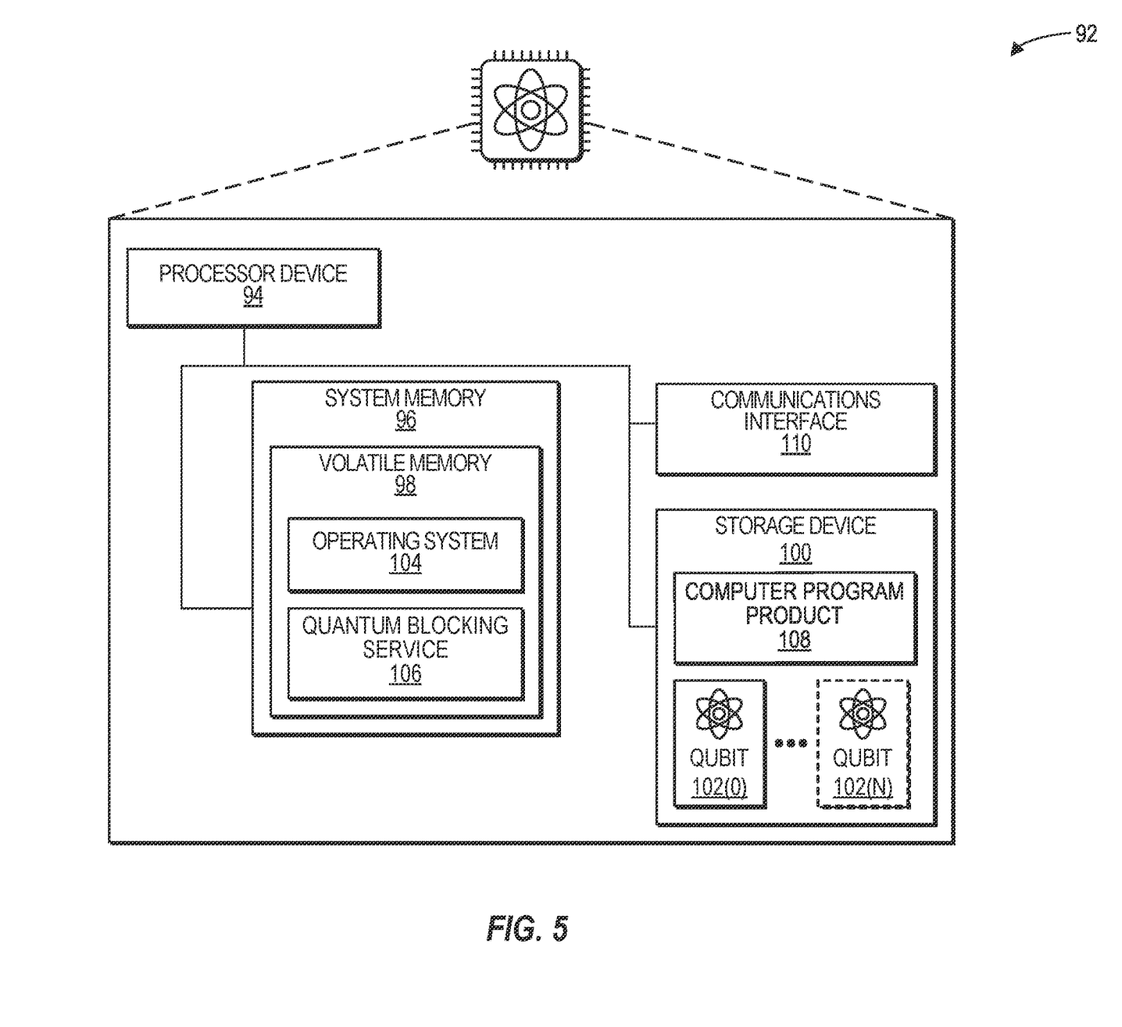
FIG. 5 is a block diagram of a quantum computing device suitable for implementing examples, according to one example.

FIG. 5 is a block diagram of a quantum computing device 92, such as the quantum computing device 12 and the quantum computing device 18 of FIG. 1, suitable for implementing examples according to one example. The quantum computing device 92 may comprise any suitable quantum computing device or devices. The quantum computing device 92 can operate using classical computing principles or quantum computing principles. When using quantum computing principles, the quantum computing device 92 performs computations that utilize quantum-mechanical phenomena, such as superposition and entanglement. The quantum computing device 92 may operate under certain environmental conditions, such as at or near zero degrees (0°) Kelvin. When using classical computing principles, the quantum computing device 92 utilizes binary digits that have a value of either zero (0) or one (1).

The quantum computing device 92 includes a processor device 94 and the system memory 96. The processor device 94 can be any commercially available or proprietary processor suitable for operating in a quantum environment. The system memory 96 may include volatile memory 98 (e.g., random-access memory (RAM)). The quantum computing device 92 may further include or be coupled to a non-transitory computer-readable storage medium such as a storage device 100. The storage device 100 and other drives associated with computer-readable media and computer-usable media may provide non-volatile storage of data, data structures, computer-executable instructions, and the like. The storage device may also provide functionality for storing one or more qubits 102(0)-102(N).

A number of modules can be stored in the storage device 100 and in the volatile memory 98, including an operating system 104 and one or more modules, such as a quantum blocking service 106. All or a portion of the examples may be implemented as a computer program product 108 stored on a transitory or non-transitory computer-usable or computer-readable storage medium, such as the storage device 100, which includes complex programming instructions, such as complex computer-readable program code, to cause the processor device 94 to carry out the steps described herein. Thus, the computer-readable program code can comprise computer-executable instructions for implementing the functionality of the examples described herein when executed on the processor device 94.

An operator may also be able to enter one or more configuration commands through a keyboard (not illustrated), a pointing device such as a mouse (not illustrated), or a touch-sensitive surface such as a display device. The quantum computing device 92 may also include a communications interface 110 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method comprising:

determining, by a quantum blocking service executing on a quantum computing device, that a first quantum process associated with one or more qubits is scheduled for execution;

accessing, by the quantum blocking service, from a qubit registry, one or more qubit registry entries that correspond to the one or more qubits, wherein the one or more qubit registry entries comprise an entanglement indicator that indicates whether a corresponding qubit is in an entangled state;

identifying, by the quantum blocking service, based on the one or more qubit registry entries, a second quantum process that is active and is accessing the one or more qubits, wherein the one or more qubit registry entries were previously updated by:

parsing, by a quantum process manager executing on the quantum computing device, a quantum assembly language (QASM) file associated with the second quantum process to identify a set of qubits to be accessed by the second quantum process;

updating, by the quantum process manager based on the set of qubits to be accessed by the second quantum process, the one or more qubit registry entries; and initiating, by the quantum process manager from the QASM file, the second quantum process;

preventing, by the quantum blocking service, the first quantum process from accessing the one or more qubits to preserve a quantum state of the one or more qubits;

subsequently determining, by the quantum blocking service, that the second quantum process is no longer accessing the one or more qubits; and enabling, by the quantum blocking service, access to the one or more qubits by the first quantum process.

2. The method of claim 1, further comprising obtaining, from the quantum process manager, metadata related to the first quantum process and the second quantum process;

wherein determining that the first quantum process is scheduled for execution and identifying the second quantum process is based on the metadata.

3. The method of claim 1, wherein preventing the first quantum process from accessing the one or more qubits comprises causing the first quantum process to be placed in a blocked state pending release of the one or more qubits by the second quantum process.

4. The method of claim 1, further comprising notifying the second quantum process that access to the one or more qubits has been requested by the first quantum process.

5. The method of claim 1, wherein enabling access to the one or more qubits by the first quantum process comprises causing the first quantum process to be placed in an active state.

6. A quantum computing device comprising:
a system memory; and
a processor device coupled to the system memory to:
determine, by a quantum blocking service, that a first quantum process associated with one or more qubits is scheduled for execution;

access, by the quantum blocking service from a qubit registry, one or more qubit registry entries that correspond to the one or more qubits, wherein the one or more qubit registry entries comprise an entanglement indicator that indicates whether a corresponding qubit is in an entangled state;

identify, by the quantum blocking service, based on the one or more qubit registry entries, a second quantum process that is active and is accessing the one or more qubits, wherein the one or more qubit registry entries were previously updated by:

parsing, by a quantum process manager executing on the quantum computing device, a quantum assembly language (QASM) file associated with the second quantum process to identify a set of qubits to be accessed by the second quantum process;

updating, by the quantum process manager based on the set of qubits to be accessed by the second quantum process, the one or more qubit registry entries; and initiating, by the quantum process manager from the QASM file, the second quantum process;

prevent, by the quantum blocking service, the first quantum process from accessing the one or more qubits to preserve a quantum state of the one or more qubits;

subsequently determine, by the quantum blocking service, that the second quantum process is no longer accessing the one or more qubits; and enable, by the quantum blocking service, access to the one or more qubits by the first quantum process.

7. The quantum computing device of claim 6, wherein:
the processor device is further to obtain, from the quantum process manager, metadata related to the first quantum process and the second quantum process; and
the processor device is to determine that the first quantum process is scheduled for execution and identifying the second quantum process based on the metadata.

8. The quantum computing device of claim 6, wherein to prevent the first quantum process from accessing the one or more qubits is to cause the first quantum process to be placed in a blocked state pending release of the one or more qubits by the second quantum process.

9. The quantum computing device of claim 6, wherein the processor device is further to notify the second quantum process that access to the one or more qubits has been requested by the first quantum process.

10. The quantum computing device of claim 6, wherein to enable access to the one or more qubits by the first quantum process is to cause the first quantum process to be placed in an active state.

11. A computer program product comprising a non-transitory computer-readable medium having stored thereon computer-executable instructions which, when executed, cause a processor device to:

determine, by a quantum blocking service, that a first quantum process associated with one or more qubits is scheduled for execution;

access, by the quantum blocking service, from a qubit registry, one or more qubit registry entries that correspond to the one or more qubits, wherein the one or more qubit registry entries comprise an entanglement indicator that indicates whether a corresponding qubit is in an entangled state;

identify, by the quantum blocking service, based on the one or more qubit registry entries, a second quantum process that is active and is accessing the one or more qubits, wherein the one or more qubit registry entries were previously updated by:

parsing, by a quantum process manager executing on the quantum computing device, a quantum assembly language (QASM) file associated with the second quantum process to identify a set of qubits to be accessed by the second quantum process;

updating, by the quantum process manager based on the set of qubits to be accessed by the second quantum process, the one or more qubit registry entries; and initiating, by the quantum process manager from the QASM file, the second quantum process;

prevent, by the quantum blocking service, the first quantum process from accessing the one or more qubits to preserve a quantum state of the one or more qubits;

subsequently determine, by the quantum blocking service, that the second quantum process is no longer accessing the one or more qubits; and enable, by the quantum blocking service, access to the one or more qubits by the first quantum process.

12. The computer program product of claim 11, wherein:
the computer-executable instructions further cause the processor device to obtain, from the quantum process manager, metadata related to the first quantum process and the second quantum process; and
the computer-executable instructions cause the processor device to determine that the first quantum process is scheduled for execution and identifying the second quantum process based on the metadata.

13. The computer program product of claim 11, wherein to prevent the first quantum process from accessing the one or more qubits is to cause the first quantum process to be placed in a blocked state pending release of the one or more qubits by the second quantum process.

14. The computer program product of claim 11, wherein the computer-executable instructions further cause the processor device to notify the second quantum process that access to the one or more qubits has been requested by the first quantum process.

15. The method of claim 1, further comprising:
modifying the one or more qubit registry entries to indicate the one or more qubits are associated with the first quantum process.

16. The quantum computing device of claim 6, wherein the processor device is further to modify the one or more qubit registry entries to indicate the one or more qubits are associated with the first quantum process.

17. The computer program product of claim 11, wherein the computer-executable instructions further cause the processor device to modify the one or more qubit registry entries to indicate the one or more qubits are associated with the first quantum process.

* * * * *